(12) United States Patent
Visani et al.

(10) Patent No.: US 12,128,411 B2
(45) Date of Patent: Oct. 29, 2024

(54) DIELECTRIC LAYERS FOR DIGITAL MICROFLUIDIC DEVICES

(71) Applicant: Nuclera Ltd, Cambridge (GB)

(72) Inventors: Cristina Visani, Cambridge, MA (US); Richard J. Paolini, Jr., Framingham, MA (US)

(73) Assignee: NUCLERA LTD, Cambridge (GB)

( * ) Notice: Subject to any disclaimer, the term of this patent is extended or adjusted under 35 U.S.C. 154(b) by 404 days.

(21) Appl. No.: 17/519,023

(22) Filed: Nov. 4, 2021

(65) Prior Publication Data

US 2022/0134344 A1 May 5, 2022

Related U.S. Application Data

(60) Provisional application No. 63/109,758, filed on Nov. 4, 2020.

(51) Int. Cl.
*B01L 3/00* (2006.01)
*G02B 26/00* (2006.01)

(52) U.S. Cl.
CPC ...... *B01L 3/502792* (2013.01); *G02B 26/005* (2013.01)

(58) Field of Classification Search
None
See application file for complete search history.

(56) References Cited

U.S. PATENT DOCUMENTS

| | | |
|---|---|---|
| 6,504,524 B1 | 1/2003 | Gates et al. |
| 6,531,997 B1 | 3/2003 | Gates et al. |
| 6,565,727 B1 | 5/2003 | Shenderov |
| 6,724,519 B1 | 4/2004 | Comiskey et al. |

(Continued)

FOREIGN PATENT DOCUMENTS

| | | |
|---|---|---|
| CN | 108519710 A | 9/2018 |
| WO | 2007/120241 A2 | 10/2007 |
| WO | 2019/026812 A1 | 2/2019 |

OTHER PUBLICATIONS

Gaskins et al., Review—Investigation and Review of the Thermal, Mechanical, Electrical, Optical, and Structural Properties of Atomic Layer Deposited High-k Dielectrics: Beryllium Oxide, Aluminum Oxide, Hafnium Oxide, and Aluminum Nitride. ECS J. Solid State Sci. & Tech. Oct. 2017;6(10):21 pages.

(Continued)

*Primary Examiner* — J. Christopher Ball
(74) *Attorney, Agent, or Firm* — McCarter & English, LLP (57) ABSTRACT

An electrowetting system is disclosed. The system includes electrodes configured to manipulate droplets of fluid in a microfluidic space. Each electrode is coupled to circuitry operative to selectively apply a driving voltage to the electrode. The system includes a dielectric stack including a first dielectric pair comprising a first layer having a first dielectric constant and a second layer having a second dielectric constant. The second dielectric constant is larger than the first dielectric constant. The dielectric stack includes a second dielectric pair comprising a third layer having a third dielectric constant and a fourth layer having a fourth dielectric constant. The fourth dielectric constant is larger than the third dielectric constant. A ratio of a thickness of the fourth layer to a thickness of the third layer ($T_4:T_3$) is in the range from about 2:1 to about 8:1. The second dielectric pair is thinner than the first dielectric pair.

15 Claims, 9 Drawing Sheets

(56) References Cited

U.S. PATENT DOCUMENTS

| | | | |
|---|---|---|---|
| 6,773,566 | B2 | 8/2004 | Shenderov |
| 6,911,132 | B2 | 6/2005 | Pamula et al. |
| 6,922,276 | B2 | 7/2005 | Zhang et al. |
| 6,977,033 | B2 | 12/2005 | Becker et al. |
| 7,002,728 | B2 | 2/2006 | Pullen et al. |
| 7,052,244 | B2 | 5/2006 | Fouillet et al. |
| 7,072,095 | B2 | 7/2006 | Liang et al. |
| 7,116,318 | B2 | 10/2006 | Amundson et al. |
| 7,119,772 | B2 | 10/2006 | Amundson et al. |
| 7,163,612 | B2 | 1/2007 | Sterling et al. |
| 7,170,670 | B2 | 1/2007 | Webber |
| 7,328,979 | B2 | 2/2008 | Decre et al. |
| 7,547,380 | B2 | 6/2009 | Velev |
| 7,641,779 | B2 | 1/2010 | Becker et al. |
| 7,715,088 | B2 | 5/2010 | Liang et al. |
| 7,839,564 | B2 | 11/2010 | Whitesides et al. |
| 7,903,322 | B2 | 3/2011 | Fang et al. |
| 9,714,463 | B2 | 7/2017 | White et al. |
| 9,726,957 | B2 | 8/2017 | Telfer et al. |
| 9,921,451 | B2 | 3/2018 | Telfer et al. |
| 9,922,603 | B2 | 3/2018 | Lin |
| 10,032,419 | B2 | 7/2018 | Lin et al. |
| 10,276,109 | B2 | 4/2019 | Crounse et al. |
| 10,303,032 | B2 | 5/2019 | Brossard et al. |
| 10,475,396 | B2 | 11/2019 | Sim et al. |
| 2003/0205632 | A1 | 11/2003 | Kim et al. |
| 2005/0179746 | A1 | 8/2005 | Roux et al. |
| 2006/0039823 | A1 | 2/2006 | Yamakawa et al. |
| 2006/0164490 | A1 | 7/2006 | Kim et al. |
| 2006/0194331 | A1 | 8/2006 | Pamula et al. |
| 2007/0023292 | A1 | 2/2007 | Kim et al. |
| 2008/0124252 | A1 | 5/2008 | Marchand et al. |
| 2009/0192044 | A1 | 7/2009 | Fouillet |
| 2009/0283407 | A1 | 11/2009 | Shah et al. |
| 2009/0296314 | A1 | 12/2009 | Yang |
| 2009/0321262 | A1 | 12/2009 | Adachi et al. |
| 2010/0096266 | A1 | 4/2010 | Kim et al. |
| 2011/0048951 | A1 | 3/2011 | Wu |
| 2016/0282605 | A1 | 9/2016 | Petcu et al. |
| 2017/0148372 | A1 | 5/2017 | Emelie et al. |
| 2017/0173580 | A1 | 6/2017 | Lowe, Jr. et al. |
| 2020/0348576 | A1 | 11/2020 | Visani et al. |
| 2021/0134585 | A1 | 5/2021 | Tsujino et al. |
| 2023/0128171 | A1 | 4/2023 | Visani et al. |

OTHER PUBLICATIONS

Schultz et al., Detailed analysis of defect reduction in electrowetting dielectrics through a two-layer 'barrier' approach. Thin Solid Films. May 1, 2013;534:348-55.

Yoon et al., Preventing Biomolecular Adsorption in Electrowetting-Based Biofluidic Chips. Anal Chem. Oct. 1, 2003;75(19):5097-5102.

Choi et al., Digital Microfluidics. Annu Rev Anal Chem (Palo Alto Calif). 2012;5:413-40.

Dhindsa et al., Virtual electrowetting channels: electronic liquid transport with continuous channel functionality. Lab Chip. 2010;10:832-836.

Johnson et al., A brief review of atomic layer deposition: from fundamentals to applications. Materials Today. Jun. 2014;17(5):236-246.

Kelly et al., Magnetron sputtering: a review of recent developments and applications. Vacuum. Mar. 2000;56(3):159-172.

International Search Report and Written Opinion for Application No. PCT/US2020/030604, dated Aug. 6, 2020, 5 pages.

U.S. Appl. No. 18/083,053, filed Dec. 16, 2022, 2023/0128171, Published.

U.S. Appl. No. 16/862,750, filed Apr. 30, 2020, 2020-0348576, Published.

International Search Report and Written Opinion for Application No. PCT/GB2021/052857, dated Feb. 24, 2022, 12 pages.

FIG. 6

DIELECTRIC LAYERS FOR DIGITAL MICROFLUIDIC DEVICES

RELATED APPLICATIONS

This application claims priority to U.S. Provisional Application No. 63/109,758 filed Nov. 4, 2020, the entire content of which are hereby incorporated by reference in their entireties.

BACKGROUND

Digital microfluidic (DMF) devices use independent electrodes to propel, split, and join droplets in a confined environment, thereby providing a "lab-on-a-chip." Digital microfluidic devices have been used to actuate a wide range of volumes (nanoliter nL to microliter μL) and are alternatively referred to as electrowetting on dielectric, or "EWoD," to further differentiate the method from competing microfluidic systems that rely on electrophoretic flow and/or micropumps. In electrowetting, a continuous or pulsed electrical signal is applied to a droplet, leading to switching of its contact angle. Liquids capable of electrowetting a hydrophobic surface often include a polar solvent, such as water or an ionic liquid, and often feature ionic species, as is the case for aqueous solutions of electrolytes. A 2012 review of the electrowetting technology was provided by Wheeler in "Digital Microfluidics," Annu. Rev. Anal. Chem. 2012, 5:413-40. The technique allows sample preparation, assays, and synthetic chemistry to be performed with tiny quantities of both samples and reagents.

SUMMARY OF INVENTION

In one embodiment, the present application provides an electrowetting system for performing droplet operations, including: electrodes configured to manipulate droplets of fluid in a microfluidic space, wherein each electrode is coupled to circuitry configured to selectively apply driving voltages to the electrode; and a dielectric stack comprising: a first dielectric pair comprising a first layer and a second layer, wherein the second layer has dielectric constant that is larger than a dielectric constant of the first layer, and a second dielectric pair comprising a third layer and a fourth layer. The fourth layer has a dielectric constant that is larger than a dielectric constant of the third layer. A ratio $T_4:T_3$ is in the range from about 2:1 to about 8:1, wherein $T_3$ is a thickness of the third layer and $T_4$ is a thickness of the fourth layer. The second dielectric pair is thinner than the first dielectric pair.

In another embodiment, the present application provides an electrowetting system for performing droplet operations, the system including: a plurality of electrodes configured to manipulate droplets of fluid in a microfluidic space, wherein each electrode is coupled to circuitry configured to selectively apply driving voltages to the electrode; and a dielectric stack comprising: a first dielectric layer, and a thin dielectric pair comprising a second dielectric layer and a third dielectric layer, wherein: the third dielectric layer has a dielectric constant greater than the dielectric constant of the second layer; a ratio $T_H:T_L$ is in the range from about 3:1 to about 8:1, wherein $T_H$ is a thickness of the third dielectric layer and $T_L$ is a thickness of the second dielectric layer; and the dielectric pair is thinner than the first dielectric layer.

In another embodiment, the present application provides an electrowetting system for performing droplet operations, the system including: a plurality of electrodes configured to manipulate droplets of fluid in a microfluidic space, wherein each electrode is coupled to circuitry configured to selectively apply driving voltages to the electrode; and a dielectric stack comprising: a first dielectric layer, and a second dielectric layer, wherein: the second dielectric layer has a dielectric constant greater than the dielectric constant of the first dielectric layer; and the second dielectric layer is thinner than the first dielectric layer.

DEFINITIONS

Unless otherwise noted, the following terms have the meanings indicated.

"Actuate" or "activate" with reference to one or more electrodes means effecting a change in the electrical state of the one or more electrodes which, in the presence of a droplet, results in a manipulation of the droplet. Activation of an electrode can be accomplished using alternating current (AC) or direct current (DC). Where an AC signal is used, any suitable frequency may be employed.

"Droplet" means a volume of liquid that electrowets a hydrophobic surface and is at least partially bounded by carrier fluid and/or, in some instances, a gas or gaseous mixture such as ambient air. For example, a droplet may be completely surrounded by carrier fluid or may be bounded by carrier fluid and one or more surfaces of an EWoD device. Droplets may take a wide variety of shapes; non-limiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more working surface of an EWoD device. Droplets may include polar fluids such as water, as is the case for aqueous or non-aqueous compositions, or may be mixtures or emulsions including aqueous and non-aqueous components. Droplets may also include dispersions and suspensions, for example magnetic beads in an aqueous solvent. In various embodiments, a droplet may include a biological sample, or portions of a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include one or more reagent, such as water, deionized water, saline solutions, acidic solutions, basic solutions, detergent solutions and/or buffers. Other examples of droplet contents include reagents, such as a reagent for a biochemical protocol, a nucleic acid amplification protocol, an affinity-based assay protocol, an enzymatic assay protocol, a gene sequencing protocol, a protein sequencing protocol, and/or a protocol for analyses of biological fluids. Further example of reagents include those used in biochemical synthetic methods, such as a reagent for synthesizing oligonucleotides finding applications in molecular biology and medicine, and nucleic acid molecules. The oligonucleotides may contain natural or chemically modified bases and are most commonly used as antisense oligonucleotides, small interfering therapeutic RNAs (siRNA) and their bioactive conjugates, primers for DNA sequencing and amplification, probes for detecting complementary DNA or RNA via molecular hybridization, tools for the targeted introduction of mutations and restriction sites in the context of technologies for gene editing such as CRISPR-Cas9, and for the synthesis of artificial genes. In further examples, the droplet contents may include reagents for peptide and protein production, for example by chemical synthesis, expression in living organisms such as bacteria or yeast cells or by the use of biological machinery in in vitro systems.

"Droplet area" means the area enclosed within the perimeter of a droplet. In the context of a droplet overlying a pixelated surface, the pixels located within the droplet area are referred to as "droplet pixels" or "pixels of the droplet". When referring to a portion of a droplet, pixels located within the area of the portion are known as "portion pixels" or "pixels of the portion".

The terms "DMF device", "EWoD device", and "Droplet actuator" refer to an electrowetting device for manipulating droplets.

"Droplet operation" means any manipulation of one or more droplets on a microfluidic device. A droplet operation may, for example, include: loading a droplet into the DMF device; dispensing one or more droplets from a source reservoir; splitting, separating or dividing a droplet into two or more droplets; moving a droplet from one location to another in any direction; merging or combining two or more droplets into a single droplet; diluting a droplet; mixing a droplet; agitating a droplet; deforming a droplet; holding a droplet in position; incubating a droplet; heating a droplet; vaporizing a droplet; cooling a droplet; disposing of a droplet; transporting a droplet out of a microfluidic device; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations includes but is not limited to microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles.

Unless otherwise indicated, the term "low-k" is intended to apply to materials having a dielectric constant (relative to vacuum) lower than 10. The term "high-k" is intended to apply to materials having a dielectric constant of 10, or greater than 10.

"Drive sequence" or "pulse sequence" denotes the entire voltage against time curve used to actuate a pixel in a microfluidic device. Often, as illustrated below, such a sequence will comprise a plurality of elements; where a given element comprises application of a substantially constant voltage for a period of time), the elements may be called "voltage pulses" or "drive pulses". The term "drive scheme" denotes a set of one or more drive sequences sufficient to effect one or more manipulations on one or more droplets in the course of a given droplet operation. Unless stated otherwise, the term "frame" denotes a single update of all the pixel rows in a microfluidic device.

"Nucleic acid molecule" is the overall name for DNA or RNA, either single- or double-stranded, sense or antisense. Such molecules are composed of nucleotides, which are the monomers made of three moieties: a 5-carbon sugar, a phosphate group and a nitrogenous base. If the sugar is a ribosyl, the polymer is RNA (ribonucleic acid); if the sugar is derived from ribose as deoxyribose, the polymer is DNA (deoxyribonucleic acid). Nucleic acid molecules vary in length, ranging from oligonucleotides of about 10 to 25 nucleotides, which are commonly used in genetic testing, research, and forensics, to relatively long or very long prokaryotic and eukaryotic genes having sequences in the order of 1,000, 10,000 nucleotides or more. Their nucleotide residues may either be all naturally occurring or at least in part chemically modified, for example to slow down in vivo degradation. Modifications may be made to the molecule backbone, e.g. by introducing nucleoside organothiophosphate (PS) nucleotide residues. Another modification that is useful for medical applications of nucleic acid molecules is 2' sugar modifications. Modifying the 2' position sugar is believed to increase the effectiveness of therapeutic oligonucleotides by enhancing their target binding capabilities, specifically in antisense oligonucleotides therapies. Two of the most commonly used modifications are 2'-O-methyl and the 2'-Fluoro.

When a liquid in any form (e.g., a droplet or a continuous body, whether moving or stationary) is described as being "on", "at", or "over" an electrode, array, matrix, or surface, such liquid could be either in direct contact with the electrode/array/matrix/surface, or could be in contact with one or more layers or films that are interposed between the liquid and the electrode/array/matrix/surface.

When a droplet is described as being "in", "on", or "loaded on" a microfluidic device, it should be understood that the droplet is arranged on the device in a manner which facilitates using the device to conduct one or more droplet operations on the droplet, the droplet is arranged on the device in a manner which facilitates sensing of a property of or a signal from the droplet, and/or the droplet has been subjected to a droplet operation on the droplet actuator.

"Each," when used in reference to a plurality of items, is intended to identify an individual item in the collection but does not necessarily refer to every item in the collection. Exceptions can occur if explicit disclosure or context clearly dictates otherwise.

Although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

DETAILED DESCRIPTION

There are two main architectures of EWoD digital microfluidic devices, i.e., open and closed systems. Typically, both EWoD configurations include a bottom plate featuring a stack of propulsion electrodes, an insulator dielectric layer, and a hydrophobic layer providing a working surface. However, closed systems also feature a top plate parallel to the bottom plate and including a top electrode serving as common counter electrode to all the propulsion electrodes. The top and bottom plates are provided in a spaced relationship defining a microfluidic region to permit droplet motion within the microfluidic region under application of propulsion voltages between the bottom electrode array and the top electrode. A droplet is placed on the working surface, and the electrodes, once actuated, can cause the droplet to deform and wet or de-wet from the surface depending on the applied voltage. When the electrode matrix of the device is being driven, each pixel of the DMF device receives a voltage pulse (i.e., a voltage differential between the two electrodes associated with that pixel) or temporal series of voltage pulses (i.e., a "waveform" or "drive sequence" or "driving sequence") in order to effect a transition from one electrowetting state of the pixel to another.

Most of the literature reports on EWoD involve so-called "segmented" devices, whereby ten to several hundred electrodes are directly driven with a controller. While segmented devices are easy to fabricate, the number of electrodes is limited by space and driving constraints and the devices need to be designed for specific applications. Accordingly, it may prove relatively problematic to perform massive parallel assays, reactions, etc. in segmented devices. In comparison, "active matrix" devices (a.k.a. active matrix EWoD, a.k.a. AM-EWoD) devices can have many thousands, hundreds of thousands or even millions of addressable electrodes and provide a general purpose panel that can be used for many different applications.

The electrodes of an AM-EWoD are often switched by a transistor matrix, such as thin-film transistors (TFTs), although electro-mechanical switches may also be used. TFT-based thin film electronics may control the addressing of voltage pulses to an EWoD array by using various circuit arrangements. TFT arrays are highly desirable for this application, due to having thousands of addressable transistors, thereby allowing mass parallelization of droplet procedures. Driver circuits may be integrated onto the AM-EWoD array substrate, and TFT-based electronics are well suited to the AM-EWoD application.

As seen above, traditional DMF systems rely on continuous actuation of droplets across the array, which over time can lead to unwanted electrochemical reactions. This in turn causes degradation of the dielectric layer stack overlaying the transistor matrix and often consisting of dielectric and/or hydrophobic materials. Protecting against electrochemical degradation is a difficult task given the aqueous solvent, salts and acids of many of the DMF reagents and relatively high voltages applied in the device which fall usually in the range of ±15V to ±30V. In many segmented DMF devices reported in the literature, protecting the device against electrochemical degradation is accomplished with dielectric layers typically hundreds of nanometers in thickness and usually made of alumina, silica, parylene or other common dielectrics. In such segmented devices, the thickness of the dielectric causes a need for very high actuation potentials, in some cases in the order of hundreds of volts, to get proper actuation of droplets through the thick dielectric. However, the use of such high voltages is often not possible in conventional TFT-based AM-EWoD devices because high voltage operation beyond the range of ±30V is apt to damage the TFT circuitry. The need to keep actuation voltages within ±30V has led to the adoption of optimized structures based on thin layers of high dielectric constant ("κ" or "k") materials which lower the voltages to actuate droplets on the DMF device. The use of advanced high quality deposition techniques like Atomic Layer Deposition (ALD) may help enable the manufacturing of thin, high-k dielectric layers capable of protecting the DMF device from electrochemical degradation. However, the aforementioned layer fabrication techniques are often very costly to implement and suffer from low manufacturing outputs.

The present disclosure provides novel and improved multi-layer dielectric stacks that combine high performance with resistance to electrochemical degradation. The dielectric stacks find use, for example, in TFT-based DMF devices. Included in the stacks are one or more layers of comparatively low dielectric constant, which provide better protection against electrical breakdown, in combination with one or more high dielectric constant layers for improving performance. Without being bound to any particular theory, it is believed that the presence of alternating multiple layers of dielectric constant, for example, a layer of low dielectric constant followed by a layer of high dielectric constant, followed by a layer of low dielectric constant and so on minimizes the likelihood of pinholes forming throughout the entire thickness of the stack while operating at higher voltages and/or corrosive solutions. Manufacturing the multi-layer dielectric stacks may be carried out with relatively costly and time-consuming deposition techniques where a high-performing and long-lasting DMF device is used. Conversely, higher output layer deposition processes may be used where long-term performance is less important and manufacturing costs are of greater concern. In sum, the dielectric stacks of the present application may be adapted to strike an optimal balance between expected results and operating expenses.

The benefits of high k dielectric materials are appreciated in the fields of materials science and electrical engineering. The dielectric constant, k, generally describes a material's ability to store electrical energy in an electric field. In general, as the dielectric constant of a material increases, the amount of an electric field that passes through that material lessens. Thus, high dielectric-constant materials are used to even out electric fields and prevent concentrated electric field gradients, which can, for example, cause unwanted electrical switching of electrical elements such as transistors. The continuity of a dielectric layer is quite important because variations in thickness or composition can create pathways for short circuits and breakdowns.

DMF Devices

Figure 1A:
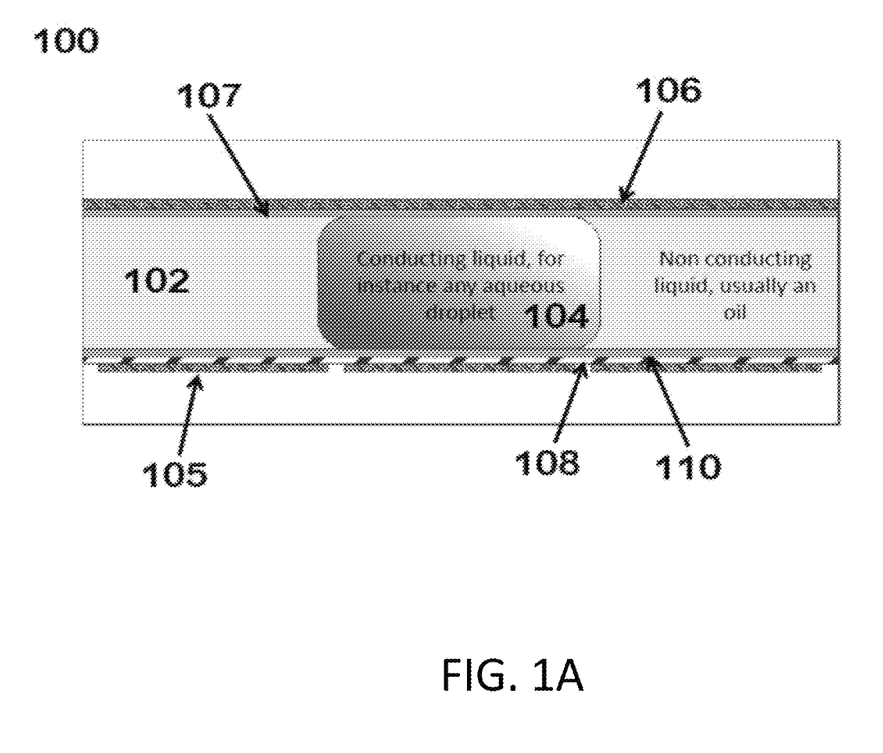
FIG. 1A is a diagrammatic cross-section of the cell of an example EWoD device.

Before proceeding further, it is desirable to illustrate the structure of a conventional DMF device. FIG. 1A shows a diagrammatic cross-section of a cell 100 in an example conventional closed EWoD device where droplet 104 is surrounded on the sides by carrier fluid 102 and sandwiched between top hydrophobic layer 107 and bottom hydrophobic layer 110. Propulsion electrodes 105 can be directly driven or switched by transistor arrays arranged to be driven with data (source) and gate (select) lines resulting in what is known as active matrix (AM) EWoD. Dielectric stack 108 is placed between electrodes 105 and bottom hydrophobic layer 110. Cell spacing is usually in the range of about 50 microns (μm) to about 500 μm.

Figure 1B:
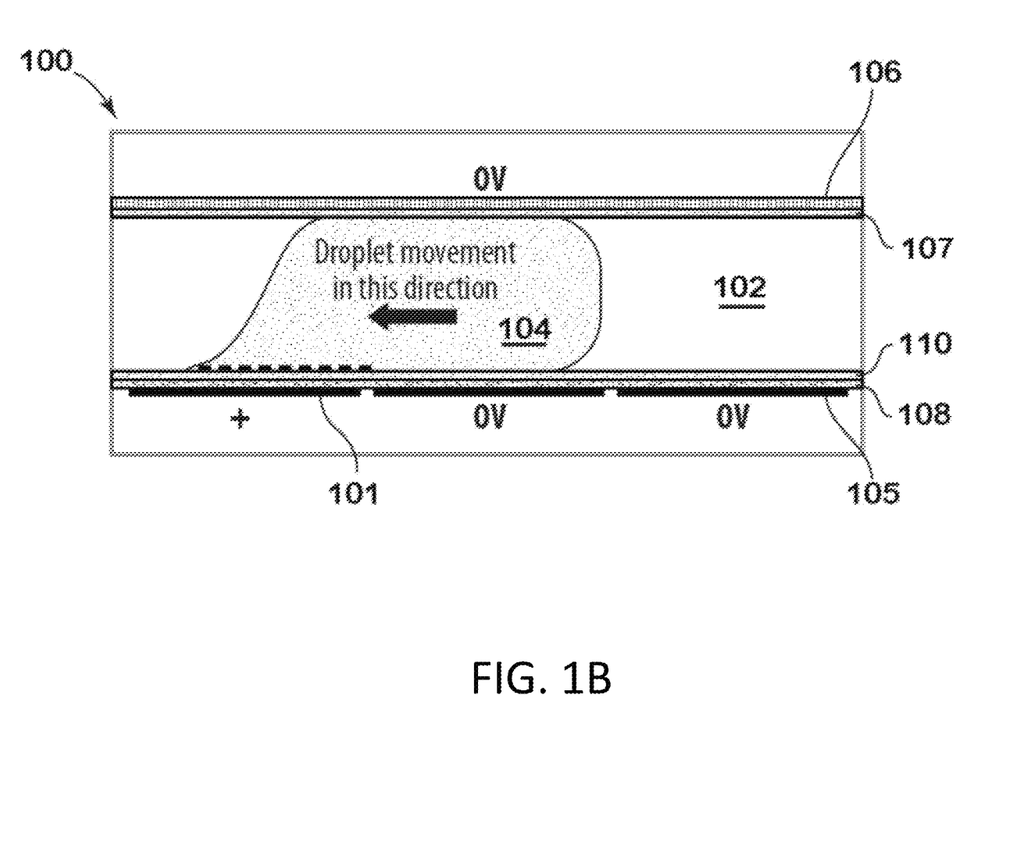
FIG. 1B illustrates EWoD operation in DC Top Plane mode.
Figure 1C:
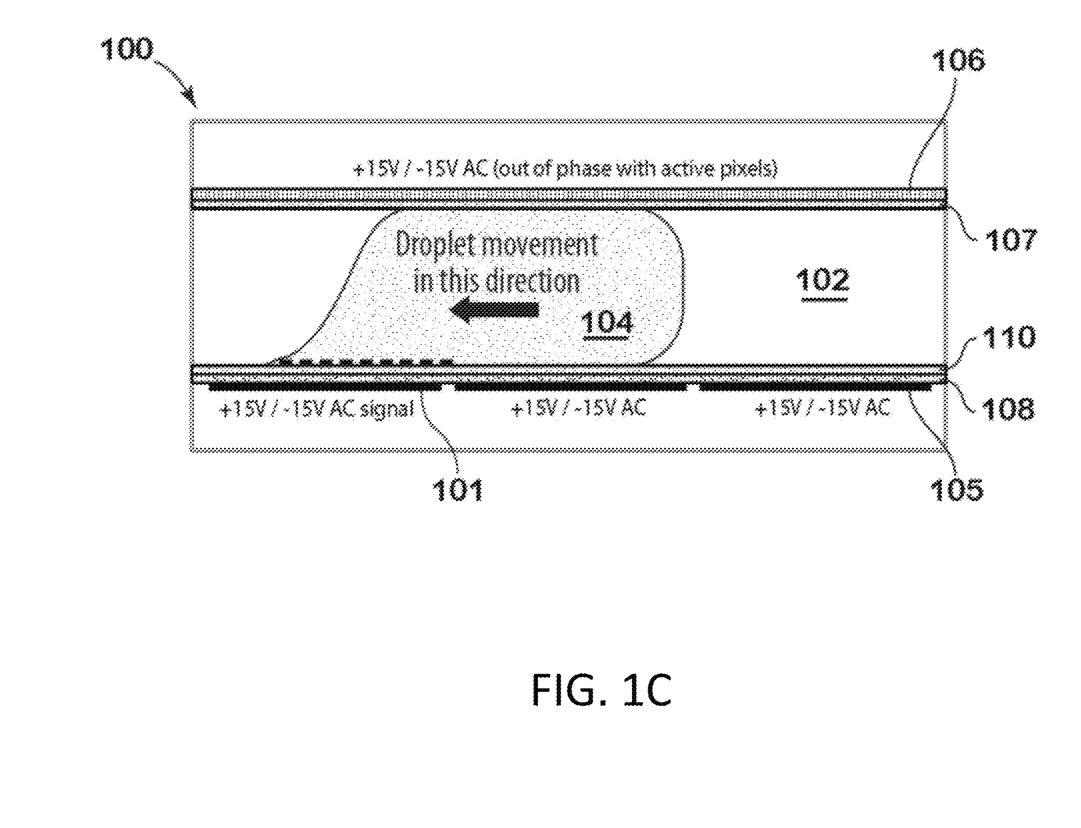
FIG. 1C illustrates EWoD operation with top plane switching (TPS).

There are two main modes of driving closed system EWoDs: "DC Top Plane" and "Top Plane Switching (TPS)". FIG. 1B illustrates EWoD operation in DC Top Plane mode, where the top plane electrode 106 is set to a potential of zero volts, for example by grounding. As a result, the potential applied across the cell 100 is the voltage on the active pixel, that is, pixel 101 having a different voltage to the top plane so that conductive droplets are attracted to the electrode. In active matrix TFT devices, this limits pixel driving voltages in the EWoD cell 100 to about ±15 V because in commonly used amorphous silicon (a-Si) TFTs the maximum voltage is in the range from about 15 V to about 20 V due to TFT electrical instabilities under high voltage operation. FIG. 1C shows driving the cell 100 with TPS, in which case the driving voltage is doubled to ±30 V by powering the top electrode out of phase with active pixels, such that the top plane voltage is additional to the voltage supplied by the TFT.

Figure 1D:
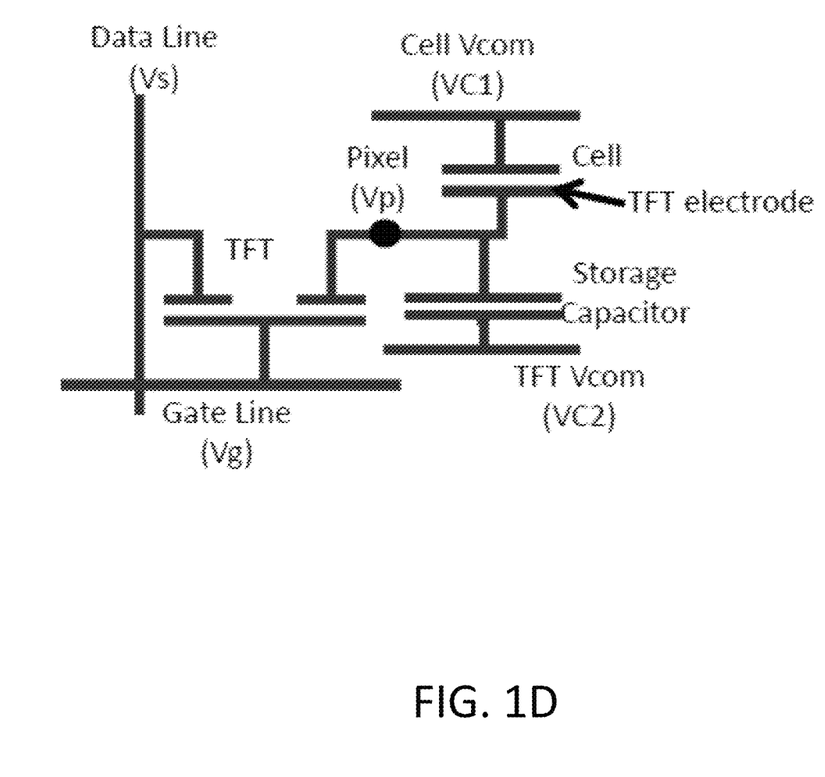
FIG. 1D is a schematic diagram of a TFT connected to a gate line, a source line, and a propulsion electrode.

Amorphous silicon TFT plates usually have one transistor per pixel, although configurations having two or more transistors are also contemplated. As illustrated in in FIG. 1D, the transistor is connected to a gate line, a source line (also known as "data line"), and a propulsion electrode. When there is large enough positive voltage on the TFT gate then there is low impedance between the source line and pixel (Vg "ON"), so the voltage on the source line is transferred to the electrode of the pixel. When there is a negative voltage on the TFT gate then the TFT is high impedance and voltage is stored on the pixel storage capacitor and not affected by the voltage on the source line as the other pixels are addressed (Vg "OFF"). If no movement is needed, or if a droplet is meant to move away from a propulsion electrode, then 0 V, that is, no voltage differential relative to the top plate, is present on the pixel electrode. Ideally, the TFT should act as a digital switch. In practice, there is still a certain amount of resistance when the TFT is in the "ON" setting, so the pixel takes time to charge. Additionally, voltage can leak from Vs to Vp when the TFT is in the "OFF" setting, causing cross-talk. Increasing the capacitance of the storage capacitor reduces cross-talk, but at the cost of rendering the pixels harder to charge.

The drivers of a TFT array receive instructions relating to droplet operations from a processing unit. The processing unit may be, for example, a general purpose computer, special purpose computer, personal computer, or other programmable data processing apparatus providing processing capabilities, such as storing, interpreting, and/or executing software instructions, as well as controlling the overall operation of the device. The processing unit is coupled to a memory which includes programmable instructions to direct the processing unit to perform various operations, such as, but not limited to, providing the TFT drivers with input instructions directing them to generate electrode drive signals in accordance with embodiments herein. The memory may be physically located in the DMF device or in a computer or computer system which is interfaced to the device and hold programs and data that are part of a working set of one or more tasks being performed by the device. For example, the memory may store programmable instructions to carry out the drive schemes described in connection with a set of droplet operations. The processing unit executes the programmable instructions to generate control inputs that are delivered to the drivers to implement one or more drive schemes associated with a given droplet operation.

Figure 2:
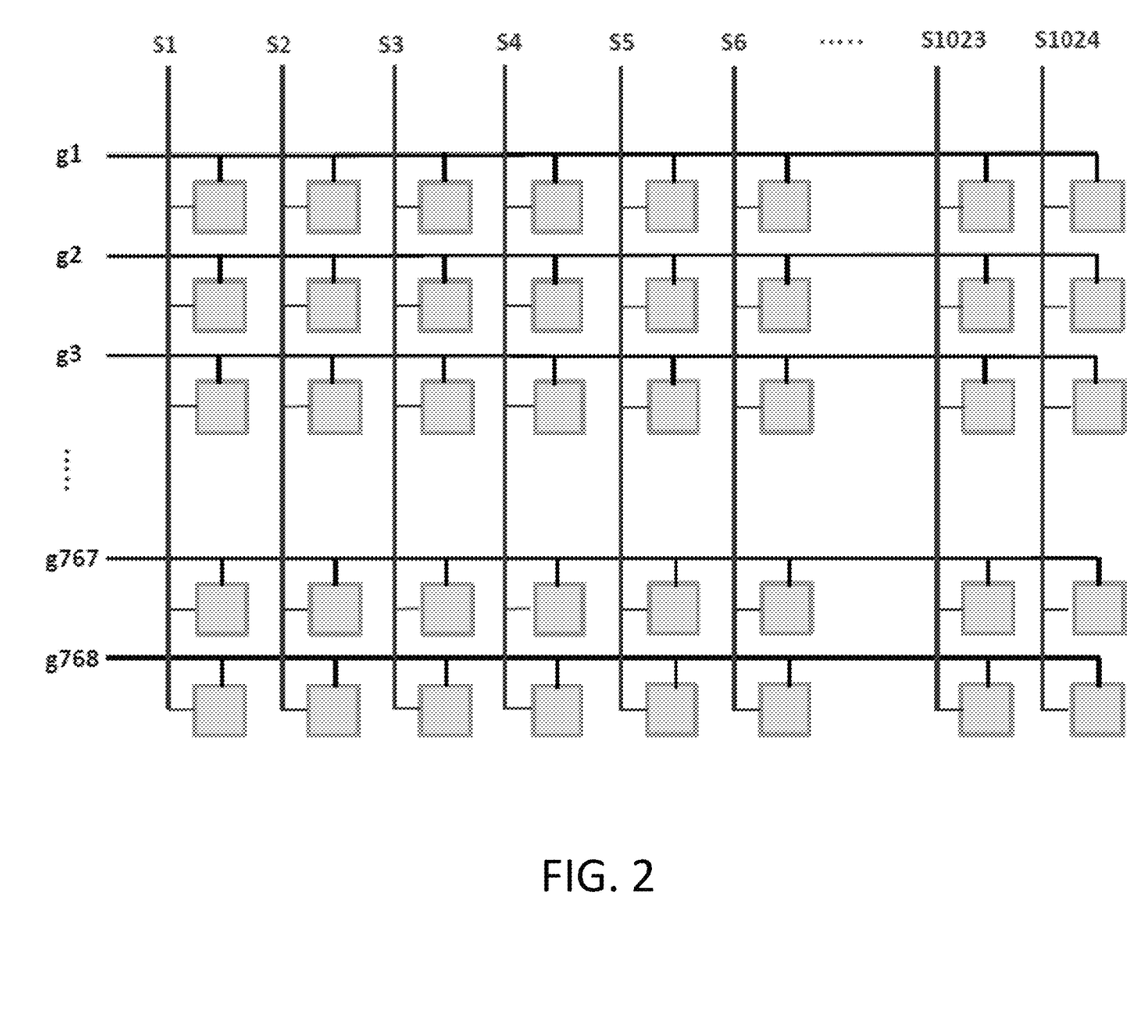
FIG. 2 is a schematic illustration of an exemplary TFT backplane controlling droplet operations in an AM-EWoD propulsion electrode array.

FIG. 2 is a diagrammatic view of an exemplary TFT backplane controlling droplet operations in an AM-EWoD propulsion electrode array. In this configuration, the elements of the EWoD device are arranged in the form of a matrix as defined by the source lines and the gate lines of the TFT array. The source line drivers provide the source levels corresponding to a droplet operation. The gate line drivers provide the signals for opening the transistor gates of electrodes which are to be actuated in the course of the operation. FIG. 2 shows the signal lines for those data lines and gate lines shown in the figure. The gate line drivers may be integrated in a single integrated circuit. Similarly, the data line drivers may be integrated in a single integrated circuit. The integrated circuit may include the complete gate and source driver assemblies together with a controller. Commercially available controller/driver chips include those commercialized by Ultrachip Inc. (San Jose, Calif.), such as UC8120; UC8130 UC8124; UC8137; UC8142; UC8143; UC8151; UC8152; UC8154; UC8155; UC8157; UC8176; UC8159; UC8111; UC8112; UC8113; UC8118; UC8119 as well as those available from Solomon Systech (Hong Kong), including SSD1633; SSD1681; SSD1675B; SSD1680/80A; SSD1619A; SSD1683; SPD1656; SSD1677; and SSD1603. The matrix of FIG. 2 is made of 1024 source lines (S1-S1024) and a total of 768 gate lines (g1-g768), although either number may change to suit the size and spatial resolution of the DMF device. Each element of the matrix contains a TFT of the type illustrated in FIG. 1D for controlling the potential of a corresponding pixel electrode, and each TFT is connected to one of the gate lines and one of the source lines.

Improved Dielectric Layer Stacks

In some embodiments, provided herein is a dielectric stack having a multi-layered structure which features a plurality of layers of alternating materials having different dielectric constants, for example, low dielectric constant or high dielectric constant to achieve an optimized balance between high DMF device performance and long lifetime. In this context, protecting the device against degradation and the successful execution of DMF operations.

A stack according to some embodiments taught herein includes two or more "dielectric pairs" where each pair features two adjacent dielectric layers. The two dielectric layers of a dielectric pair are directly adjacent, although additional intervening layers or coatings may also be present when desired. The first layer of a dielectric pair includes a first material characterized by a first dielectric constant while the second layer includes a second material having a second dielectric constant, where the second dielectric constant is higher than the first dielectric constant. As such, for the purposes of this disclosure, the first layer may be classified as a "low-k" layer, where $k_{11}$ represents its dielectric constant, and the second layer may be referred to as a "high-k" material characterized by a second dielectric constant $k_{12}$, where $k_{12} > k_{11}$. The second dielectric pair includes a layer of dielectric constant $k_{21}$ and a layer of dielectric constant $k_{22}$, where $k_{22} > k_{21}$. More generally, each successive dielectric pair may be labeled with a natural number "m", where $k_{m1}$ is the dielectric constant of the low-k layer of the $m^{th}$ dielectric pair and $k_{m2}$ is the dielectric constant of the high-k layer of the $m^{th}$ dielectric pair, such that $k_{m2} > k_{m1}$. In a dielectric stack featuring a total of "n" dielectric pairs, each pair may be labeled in ascending order from first (m=1) to last (m=n).

The thickness of each individual layer is categorized in a similar fashion, whereby the thickness of the first layer of the $m^{th}$ dielectric pair is labeled as "$T_{m-1}$" while the thickness of the second layer of the $m^{th}$ dielectric pair is labeled as "$T_{m-2}$". The thickness of a layer or dielectric pair may be measured along the direction perpendicular to the upper surface of the glass substrate, as exemplified by axis 30 in FIG. 3.

Figure 3:
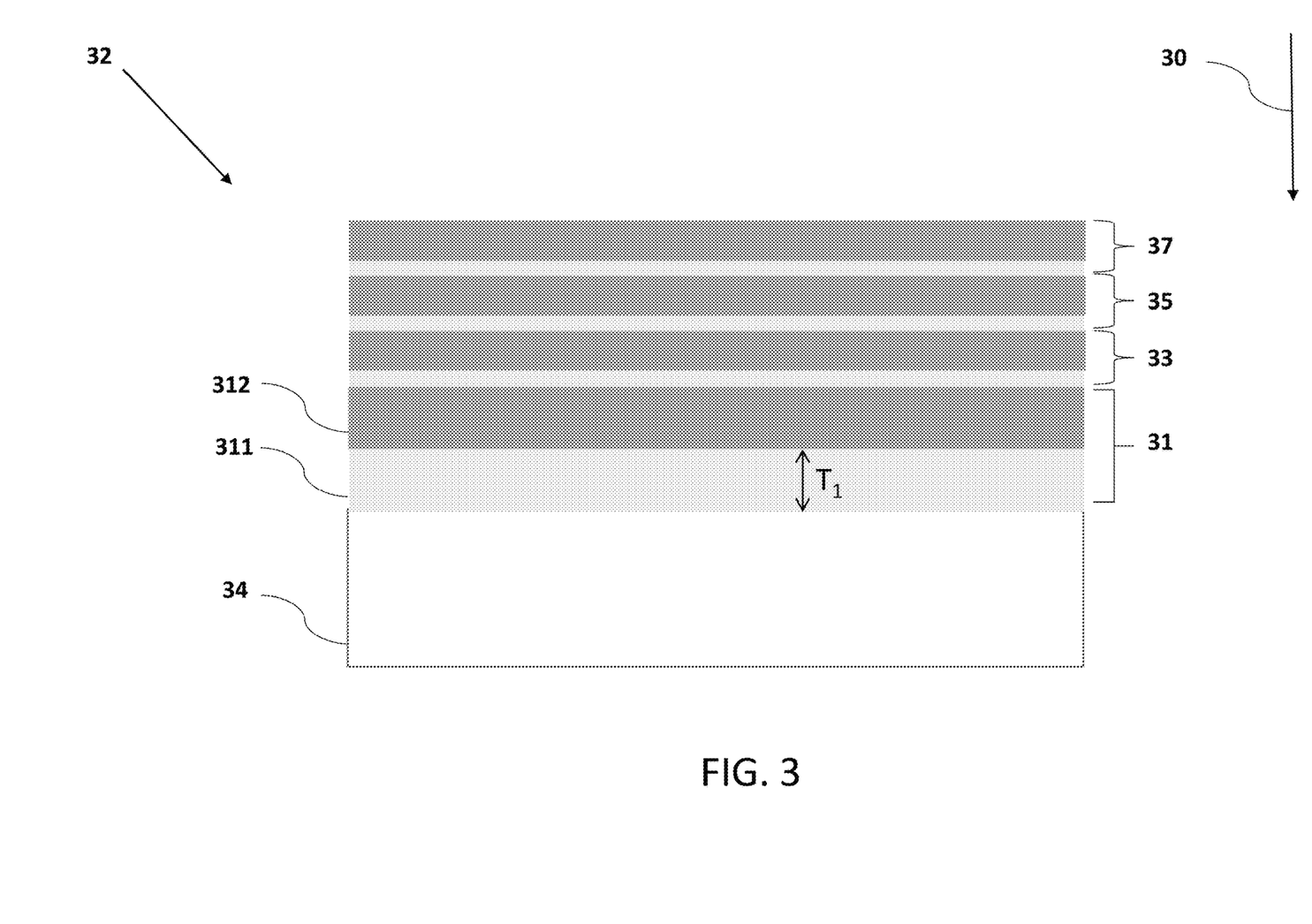
FIG. 3 is a schematic diagram of a high-performance stack covering a TFT array with alternating layers of low-k dielectric and high-k dielectric.

Still referring to FIG. 3, the multi-layer dielectric stack 32 illustrated therein features a total of four dielectric pairs (n=4) which are spatially arranged to form the stack covering a glass substrate with TFT-driven electrode array 34. A first, thicker dielectric pair 36 (m=1) is composed a low-k first layer 311 and a high-k second layer 312. Layers 311 and 312 are about equal in thickness such that ratio $T_{12}:T_{11}$ is about 1:1, although variations spanning a range from about 0.5:1 to about 1.5:1 or from about 0.75:1 to about 1.25:1 are contemplated. First dielectric pair 31 is the thickest in the structure and accounts for about half the overall thickness of the dielectric stack. Second dielectric pair 33 (m=2), third dielectric pair 35 (m=3), and fourth dielectric pair 37 (m=4) are all thinner than first dielectric pair 31.

As outlined above, each of the second, third, and fourth dielectric pairs includes a low-k layer of thickness $T_{m-1}$ and a high-k layer of thickness $T_{m-2}$. However, and unlike in the first dielectric couple, the relative thicknesses of the layers are such that $T_{m-2}:T_{m-1}$ is equal to about 5:1 for m=2, 3, or 4. Accordingly, the layers of stack 32 may be characterized as set out in Table 1. In the Table, each layer is labeled with a code as outlined above, e.g., the first layer of the first pair is labeled "1-1", the second layer of the second pair is labeled "1-2", and so on:

TABLE 1

| Layer | Layer Code | Relative Thickness (% of stack total) |
|---|---|---|
| Dielectric pair 31, first layer 311 | 1-1 | ~25% |
| Dielectric pair 31, second layer 312 | 1-2 | ~25% |
| Dielectric pair 33, first layer | 2-1 | ~2.6% |
| Dielectric pair 33, second layer | 2-2 | ~14% |
| Dielectric pair 35, first layer | 3-1 | ~2.6% |
| Dielectric pair 35, second layer | 3-2 | ~14% |
| Dielectric pair 37, first layer | 4-1 | ~2.6% |
| Dielectric pair 37, second layer | 4-2 | ~14% |

There is no theoretical limit to number the number of thinner dielectric pairs in a stack (that is, n−1). ALD techniques allow for the deposition of nearly atom-thin layers, the only requirement being that a layer be of sufficient thickness to achieve a satisfactory level of uniformity and the absence of patches. In exemplary embodiments, the number of thinner dielectric pairs may be 1, 2, 3, 4, 5, 10, 15, 20, or even higher. Moreover, the ratio $T_{m-2}:T_{m-1}$ in a thinner dielectric pair may be greater than or less than about 5:1. In one embodiment, the ratio may fall in the range from about 2:1 to about 10:1 or, more specifically, in the range from about 2:1 to about 8:1, from about 3:1 to about 8:1, from about 4:1 to about 6:1, or from about 4.5:1 to about 5.5:1. The overall thickness of the stack is typically between about 100 nm to about 300 nm, but other values may be acceptable to achieve the desired level of performance and stack corrosion resistance.

The multi-layer stack may be created with the formation of alternating layers of low-k materials and high-k materials by Atomic Layer Deposition (ALD) techniques which are especially suited to the fabrication of high-quality layers. If lowering manufacturing costs is the priority, industrial vapor deposition methods may be applied. The embodiment in the diagram of FIG. 3 illustrates first, thicker dielectric pair 31 at the bottom of the stack. However, different arrangements are acceptable, for example those where one or more of 33, 35, and 37 are on opposite sides of 31 or where 31 is the topmost dielectric pair. Moreover, FIG. 3 depicts each low-k layer at the bottom of its respective dielectric pair, but other configurations where in one or more pairs the low-k is at the top of its dielectric pair are also contemplated.

In the initial step of ALD, a substrate is provided upon which the dielectric stack will be coated. The substrate is often cleaned prior to coating, for example with ethanol or isopropyl alcohol. The substrate may be any material, provided that the material is stable during the atomic layer deposition (ALD) and sputtering steps described below. For example, the substrate may be a printed circuit board, coated glass, such as ITO-coated glass, or an active matrix TFT backplane microfabricated on glass or other substrate material. The next step is to deposit the first layer upon the substrate using atomic layer deposition, typically plasma-assisted ALD or (thermal) water-vapor assisted ALD. For example, a first layer of aluminum oxide may be fabricated using trimethylaluminum ($Al(CH_3)_3$) or $Ta[(N(CH_3)_2)_3NC(CH_3)_3]$ in conjunction with oxygen plasma at around 180° C. substrate temperature and low pressure (less than 100 mbar). Alternatively, a layer of aluminum oxide may be deposited using a trimethylaluminum-water process. The atomic layer deposition may be done at a rate of greater than 0.1 nm/min, e.g., 0.2 nm/min or greater. The final thickness of aluminum oxide or a hafnium oxide is typically between 9 nm and 80 nm thick. Details of these ALD process are described by Bent and co-workers in "A brief review of atomic layer deposition: from fundamentals to applications," *Materials Today*, (2014), vol. 17, No. 5, p. 236-46, which is incorporated by reference in its entirety herein.

In some embodiments, the high performance dielectric stack of FIG. 3, the low-k material is alumina ($Al_2O_3$), the high-k material is hafnium oxide ($HfO_2$). The targeted total thickness is about 200 nm, such that the thickness of each layer is as set out in Table 2:

TABLE 2

| Layer | Layer Code | Layer Thickness (nm) |
|---|---|---|
| Dielectric pair 31, first layer 311 | 1-1 | 50 |
| Dielectric pair 31, second layer 312 | 1-2 | 50 |
| Dielectric pair 33, first layer | 2-1 | 5 |
| Dielectric pair 33, second layer | 2-2 | 28 |
| Dielectric pair 35, first layer | 3-1 | 5 |
| Dielectric pair 35, second layer | 3-2 | 28 |

TABLE 2-continued

| Layer | Layer Code | Layer Thickness (nm) |
|---|---|---|
| Dielectric pair 37, first layer | 4-1 | 5 |
| Dielectric pair 37, second layer | 4-2 | 28 |

The choice of alumina as the low-k dielectric is partially due to the availability and ease of use in ALD deposition combined with its relatively high dielectric breakdown strength. Other materials for low-k dielectric include silica ($SiO_2$) and silicon nitride ($Si_3N_4$). Hafnium oxide is chosen primarily for its combination of high dielectric constant and biocompatibility. Other suitable high-k dielectrics include tantalum oxide ($Ta_2O_5$), zirconium oxide ($ZrO_2$), and lanthanum oxide ($La_2O_5$).

To provide comprehensive protection for the TFT, the stack may be completed by one or multiple polymeric and hydrophobic layers, for example a silane adhesion promoter film on which a protective coating is applied. Protective coatings include polymeric materials deposited on electronic circuits and other equipment as electrical insulation, moisture barriers, and protection against corrosion and chemical attack. Common protective materials include parylenes, a family of polymers whose backbone consists of para-benzenediyl rings —$C_6H_4$— connected by 1,2-ethanediyl bridges —$CH_2$—$CH_2$—. "Parylene N" is the unsubstituted polymer obtained by polymerization of the para-xylylene precursor. Derivatives of parylene may be obtained by replacing hydrogen atoms on the phenyl ring or the aliphatic bridge by other functional groups. The most common of these variants is "parylene C" which has one hydrogen atom in an aryl ring replaced by chlorine. Another common halogenated variant is "parylene AF-4", with the four hydrogen atoms on the aliphatic chain replaced by fluorine atoms. Parylene layers may be formed by methods well-known to those of skill in the art, for example chemical vapor deposition (CVD).

The protective coating may in turn be covered with a hydrophobic, chemically inert top layer which forms the bottom surface of the microfluidic space. In some embodiments, the surface layer materials include fluorinated and perfluorinated polymers, e.g., Teflon® AF, fluorinated polysiloxanes, the family of fluoropolymers commercially available under the trade name CYTOP™ (AGC Chemicals Company, Japan), and the perfluoroalkyl polymers that are marketed under the brand name FLUOROPEL™ (Cytonix, Md.).

In some embodiments, there is provided a dielectric stack suited to instances where containing manufacturing costs is afforded higher priority and comparatively inexpensive, high-volume dielectric deposition processes are preferred. For devices whose long-term performance is of lesser importance and/or instances where the use of corrosive substances is not contemplated, a large portion of the dielectric stack may be formed with less costly materials and through inexpensive, high-volume dielectric deposition processes like plasma enhanced chemical vapor deposition (PECVD). More complex and costly high-quality deposition techniques like ALD may be used to fabricate a smaller portion of the stack. The smaller portion may take the form of one of the aforementioned thinner dielectric pairs that are characterized by a $T_{m-2}:T_{m-1}$ ratio that is equal to about 5:1. In one embodiment, the ratio may fall in the range from about 2:1 to about 10:1 or, more specifically, in the range from about 3:1 to about 8:1, from about 4:1 to about 6:1, or from about 4.5:1 to about 5.5:1. This combined approach may help prevent the formation of pinholes but also substantially reduces costs and deposition times while increasing production output. In some embodiments, the dielectric stack has a total thickness from about 70 nm to about 300 nm.

Figure 4:
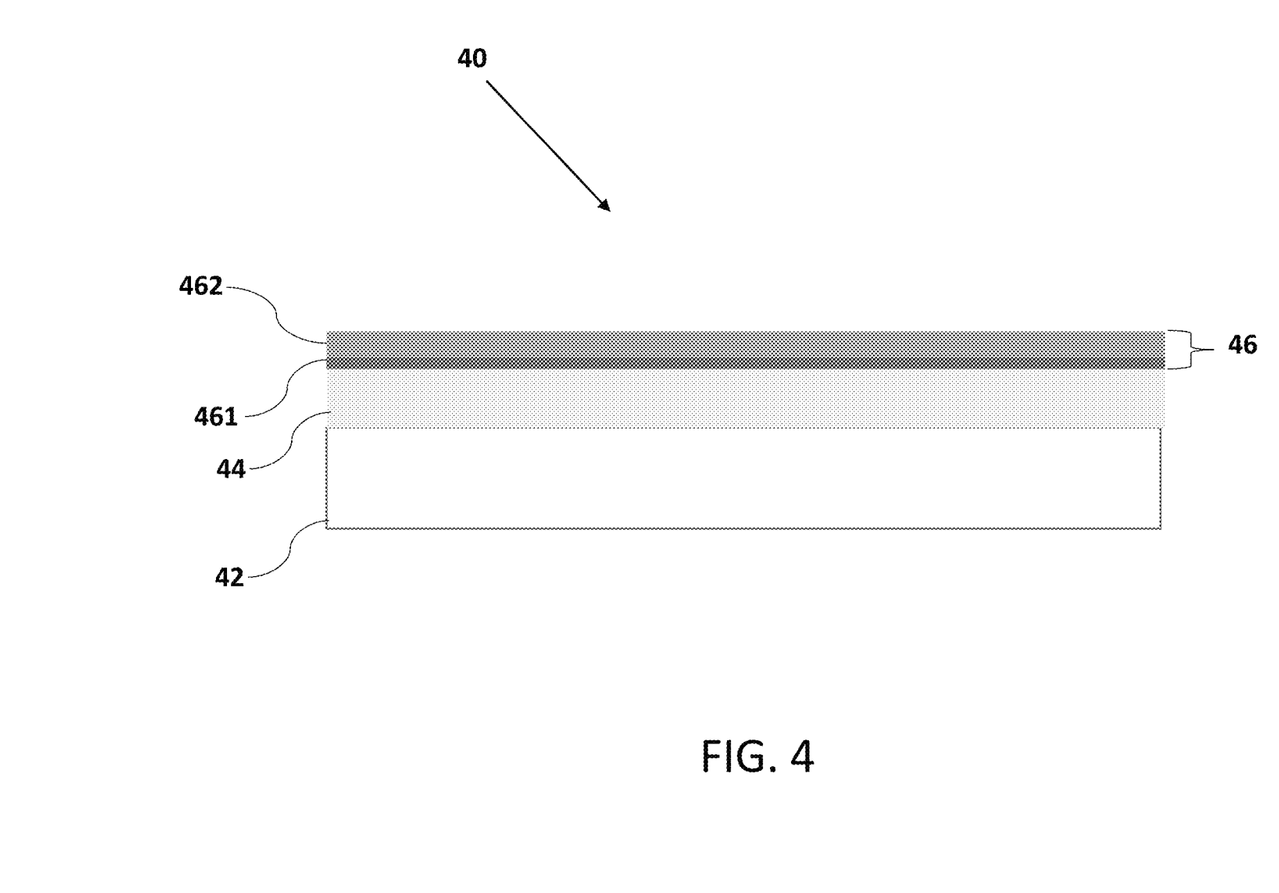
FIG. 4 is a schematic diagram of a dielectric stack featuring a single layer of relatively inexpensive low-k dielectric and a dielectric pair that includes a low-k layer and a high-k layer which are formed by atomic layer deposition.

FIG. 4 schematically illustrates a construct 40 according to some embodiments of the present application. A relatively thick first layer 44 is deposited with a low-cost technique, for example plasma-enhanced chemical vapor deposition (PECVD), on glass substrate with TFT array 42. The first layer 44 makes up at least half of the dielectric stack thickness and is formed of a low-k material such as silicon nitride ($Si_3N_4$) which typically takes only minutes to form by PECVD. Then, dielectric pair 46 is formed over first layer 44. The dielectric pair is composed of low-k first layer 461 having thickness $T_L$ and high-k second layer 462 having thickness $T_H$. The ratio $T_H:T_L$ is typically equal to about 5:1. Both layers of the dielectric pair are formed with a slower, high-quality deposition method such as ALD. In one embodiment, layer 461 may be made of alumina or silica, while layer 462 may be made of hafnium oxide.

In some embodiments, the present application provides a simplified dielectric stack for a disposable device that is meant to perform for a short duration of time. As costs and manufacturing output may be factors, the dielectric stack includes a first relatively thick low-k dielectric layer that is formed with an industrial vapor deposition process like PECVD. A thinner second layer of a high-k material is deposited on the first layer with a higher-quality deposition process such as ALD, to form a simple, two-layer stack having a total thickness from about 70 nm to about 300 nm.

Figure 5:
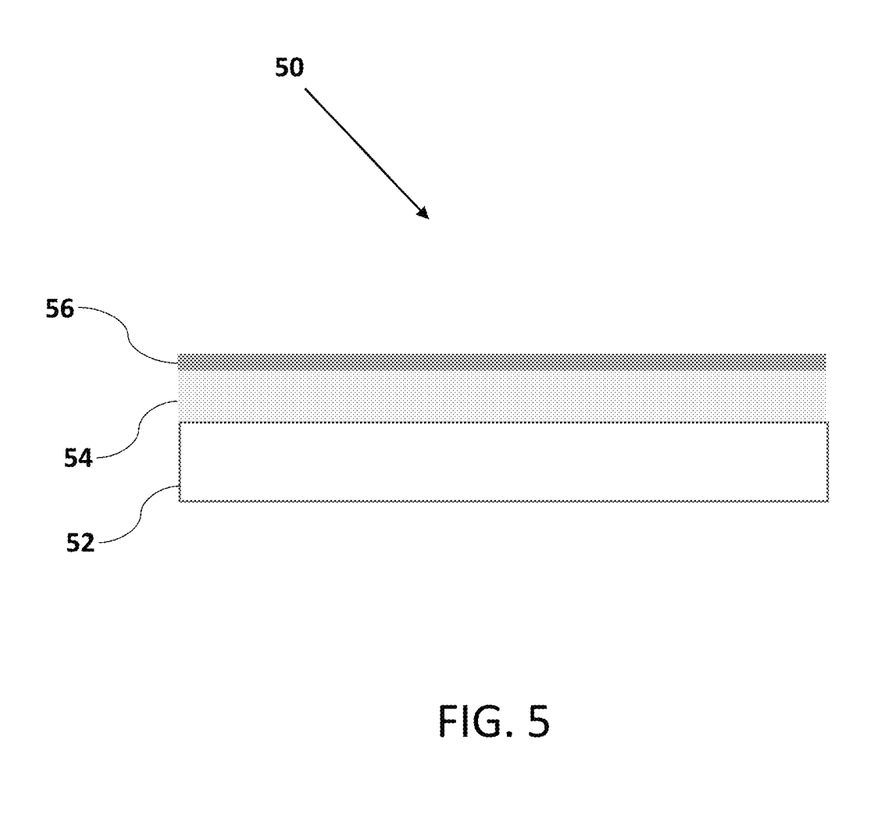
FIG. 5 is a schematic diagram of a dielectric stack featuring a single layer of relatively inexpensive low-k dielectric and a high-k layer formed by atomic layer deposition.

FIG. 5 schematically illustrates a construct 50 according to some embodiments of the present application. A glass substrate with a TFT array 52 is first subjected to the deposition of a low-k dielectric layer 54 by PECVD. Then, a thinner, high-k dielectric layer containing hafnium oxide 56 is formed by ALD. This combined approach may help prevent the formation of pinholes but also substantially reduces costs and deposition times while increasing production output. In one embodiment, the ratio $T_L:T_H$ is equal to about 5:1, where $T_L$ is the thickness of the low-k dielectric layer and $T_H$ is the thickness of the high-k dielectric layer. However, the ratio may fall in the range from about 2:1 to about 10:1 or, more specifically, in the range from about 3:1 to about 8:1, from about 4:1 to about 6:1, or from about 4.5:1 to about 5.5:1. In some embodiments, the dielectric stack has a total thickness from about 70 nm to about 300 nm.

The stack may completed with single or multiple polymer and/or hydrophobic layers for further protection. In one embodiment, there may one or more polymer dielectric layers over the dielectric stack which are then covered with a hydrophobic layer. Alternatively, there may be just a single hydrophobic layer on top of the dielectric stack. In one example, the stack is covered with a film of silane adhesion promoter on which a layer of protective coating, e.g., parylene C, is formed. As disclosed above, the protective coating may in turn be covered with a hydrophobic, chemically inert outer layer which forms the bottom surface of the microfluidic space, for example Teflon®, fluorinated polysiloxanes, CYTOP™, or FLUOROPEL™. In addition to the hydrophobic outer layer, a material like Parylene AF-4 or Parylene HT may serve as added protection and as outer hydrophobic layer both included in a single layer.

In some embodiments where the high-K dielectric is not included, the adhesion and polymeric layers provide all of the additional protection for the device in addition to the relatively thick low-K dielectric layer.

Figure 6:
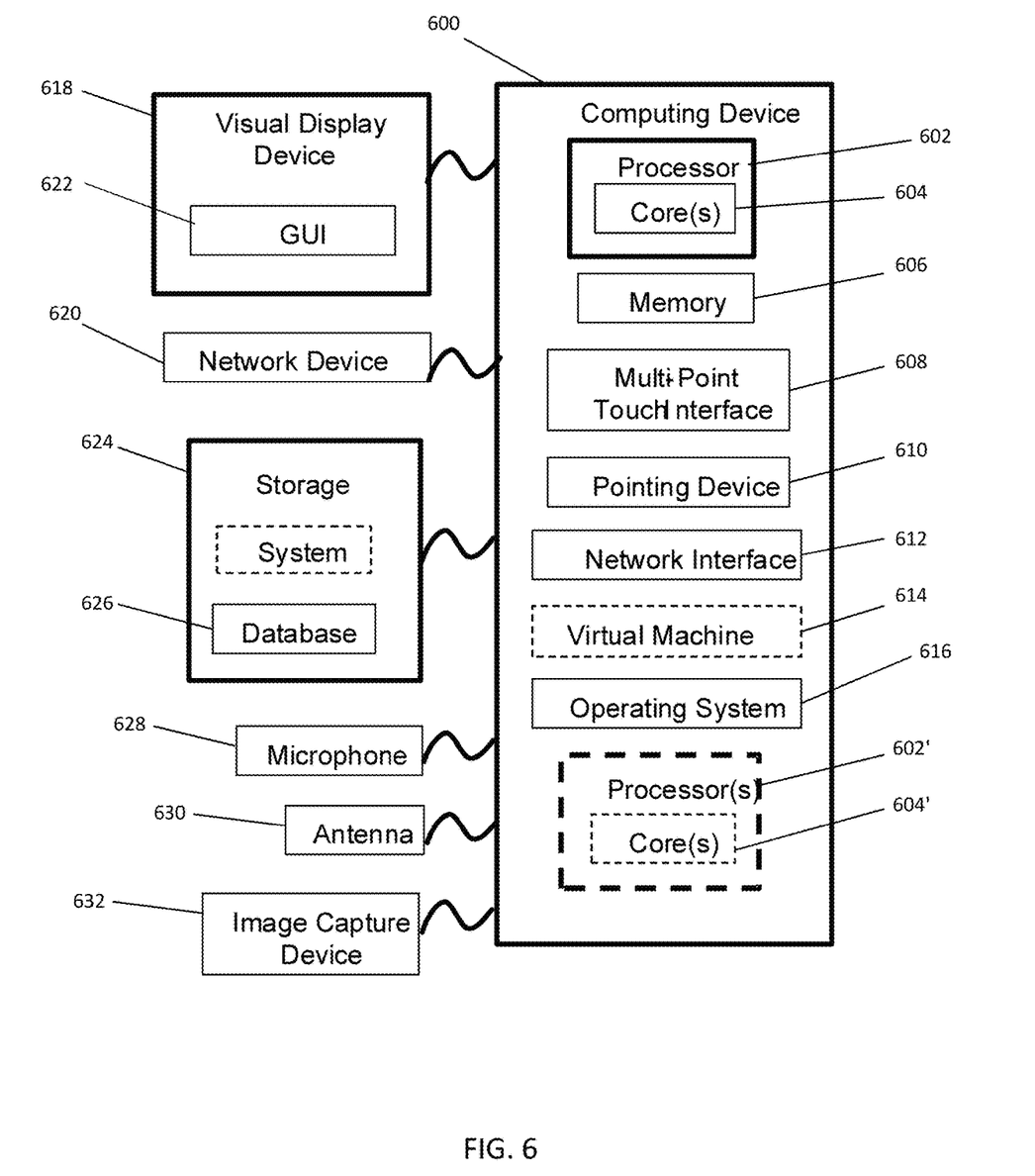
FIG. 6 is a block diagram of an exemplary computing device that can be used to perform one or more steps of the methods provided by exemplary embodiments.

FIG. 6 is a block diagram of an exemplary computing device that can be used to perform one or more steps of the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor. The computing device 600 also includes a graphics processing unit (GPU) 605. In some embodiments, the computing device 600 includes multiple GPUs. The computing device also includes an operating system 616, network device 620, microphone 628, antenna 630, amd image capture device 632.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof. A user can interact with the computing device 600 through a visual display device 618, such as a touch screen display or computer monitor, which can display one or more user interfaces 619. The visual display device 618 can also display other aspects, elements and/or information or data associated with exemplary embodiments. The computing device 600 can include other I/O devices for receiving input from a user, for example, a keyboard or any suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software that implements exemplary embodiments of the notification system as described herein, or portions thereof, which can be executed to generate user interface 619 on display 618. Exemplary storage device 624 can also store one or more databases for storing any suitable information required to implement exemplary embodiments. The databases can be updated by a user or automatically at any suitable time to add, delete or update one or more items in the databases. Exemplary storage device 624 can store one or more databases 626 for storing provisioned data, and other data/information used to implement exemplary embodiments of the systems and methods described herein.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other embodiments, functions and advantages are also within the scope of the present disclosure.

It will be apparent to those skilled in the art that numerous changes and modifications can be made in the embodiments of the technology described herein without departing from the scope of the invention. Accordingly, the whole of the foregoing description is to be interpreted in an illustrative and not in a limitative sense. The functional aspects described herein that are implemented on a processing unit, as will be understood from the teachings hereinabove, may be implemented or accomplished using any appropriate implementation environment or programming language, such as C, C++, Cobol, Pascal, Java, Java-Script, HTML, XML, dHTML, assembly or machine code programming, and the like. All of the contents of the aforementioned patents and applications are incorporated by reference herein in their entireties. In the event of any inconsistency between the content of this application and any of the patents and applications incorporated by reference herein, the content of this application shall control to the extent necessary to resolve such inconsistency.

The invention claimed is:

1. An electrowetting system for performing droplet operations, the system including:
    a plurality of electrodes configured to manipulate droplets of fluid in a microfluidic space, wherein each electrode is coupled to circuitry operative to selectively apply a driving voltage to the electrode; and
    a dielectric stack comprising:
    a first dielectric pair comprising a first layer having a first dielectric constant and a second layer having a second dielectric constant, wherein the second dielectric constant is larger than the first dielectric constant, and
    a second dielectric pair comprising a third layer having a third dielectric constant and a fourth layer having a fourth dielectric constant, wherein:
        the fourth dielectric constant is larger than the third dielectric constant;
        a ratio $T_4:T_3$ is in the range from about 2:1 to about 8:1, wherein $T_3$ is a thickness of the third layer and $T_4$ is a thickness of the fourth layer; and
        the total thickness of the second dielectric pair is thinner than the total thickness of the first dielectric pair.

2. The electrowetting system according to claim 1, wherein the ratio $T_4:T_3$ is in the range from about 4.5:1 to about 5.5:1.

3. The electrowetting system according to claim 1, wherein the first layer and the third layer each comprise a material independently selected from the group consisting of alumina ($Al_2O_3$), silica ($SiO_2$), and silicon nitride ($Si_3N_4$).

4. The electrowetting system according to claim 1, wherein the second layer and the fourth layer each comprise a material independently selected from the group consisting of hafnium oxide ($HfO_2$), tantalum oxide ($Ta_2O_5$), titanium oxide ($TiO_2$), zirconium oxide ($ZrO_2$), yttrium oxide ($Y_2O_3$), and lanthanum oxide ($La_2O_5$).

5. The electrowetting system according to claim 1, wherein first, second, third, and fourth layers are formed by atomic layer deposition (ALD).

6. The electrowetting system according to claim 1, further comprising a third dielectric pair comprising a fifth layer having a fifth dielectric constant and a sixth layer having a sixth dielectric constant and a fourth dielectric pair comprising a seventh layer having a seventh dielectric constant and an eighth layer having an eighth dielectric constant, the sixth dielectric constant is larger than the fifth dielectric constant;
    a ratio $T_6:T_5$ is in the range from about 3:1 to about 8:1, wherein $T_5$ is a thickness of the fifth layer and $T_4$ is a thickness of the fourth layer;
    the third dielectric pair is thinner than the first dielectric pair;
    the eighth dielectric constant that is larger than the seventh dielectric constant;
    a ratio $T_8:T_7$ is in the range from about 3:1 to about 8:1, wherein $T_7$ is a thickness of the seventh layer and $T_8$ is a thickness of the eighth layer; and
    the fourth dielectric pair is thinner than the first dielectric pair.

7. The electrowetting system according to claim 1, further comprising 1 to 10 further dielectric pairs, wherein:
    each further dielectric pair is thinner than the first electric pair; and
    each further dielectric pair comprises two layers, wherein one of the two layers has a higher dielectric constant than the other of the two layers.

8. The electrowetting system according to claim 7, wherein each layer of each thin dielectric pair is formed by atomic layer deposition (ALD).

9. An electrowetting system for performing droplet operations, the system including:
    a plurality of electrodes configured to manipulate droplets of fluid in a microfluidic space, wherein each electrode is coupled to circuitry operative to selectively apply a driving voltage to the electrode; and
    a dielectric stack comprising:
    a first dielectric layer having a first dielectric constant, and
    a thin dielectric pair comprising a second dielectric layer having a second dielectric constant and a third dielectric layer having a third dielectric constant:
        the third dielectric constant greater than the second dielectric constant;
        a ratio $T_H:T_L$ is in the range from about 3:1 to about 8:1, wherein TH is a thickness of the third dielectric layer and TL is a thickness of the second dielectric layer; and
    the dielectric pair is thinner than the first dielectric layer.

10. The electrowetting system according to claim 9, wherein the third dielectric layer has a dielectric constant that is greater than the dielectric constant of the first dielectric layer.

11. The electrowetting system according to claim 9, wherein the first dielectric layer comprises silicon nitride alumina ($Al_2O_3$), silica ($SiO_2$), or silicon nitride ($Si_3N_4$).

12. The electrowetting system according to claim 9, wherein the first dielectric layer is formed by plasma enhanced chemical vapor deposition (PECVD).

13. The electrowetting system according to claim 9, wherein the second dielectric layer comprises a material selected from the group consisting of alumina ($Al_2O_3$) and silica ($SiO_2$).

14. The electrowetting system according to claim 9, wherein the third dielectric layer comprises a material selected from the group consisting of hafnium oxide ($HfO_2$), tantalum oxide ($Ta_2O_5$), titanium oxide ($TiO_2$), zirconium oxide ($ZrO_2$), yttrium oxide ($Y_2O_3$), and lanthanum oxide ($La_2O_5$).

15. The electrowetting system according to claim 9, wherein the second dielectric layer and the third dielectric layer are formed by atomic layer deposition (ALD).

* * * * *